United States Patent
Currie

(10) Patent No.: US 7,107,138 B2
(45) Date of Patent: Sep. 12, 2006

(54) AUTOMOTIVE SPEED CONTROL DISABLE SWITCH

(76) Inventor: Joseph Edward Currie, 506 White Plains Rd., Webster, NH (US) 03303-7112

(*) Notice: Subject to any disclaimer, the term of this patent is extended or adjusted under 35 U.S.C. 154(b) by 90 days.

(21) Appl. No.: 10/979,569

(22) Filed: Nov. 2, 2004

(65) Prior Publication Data

US 2006/0095190 A1 May 4, 2006

(51) Int. Cl.
*G06F 7/70* (2006.01)
*G06F 19/00* (2006.01)

(52) U.S. Cl. .................. 701/79; 701/80; 701/73; 303/132

(58) Field of Classification Search .......... 701/79, 701/80, 36, 73, 101, 1, 41, 200, 201, 78; 340/436; 180/197, 408, 167; 477/45; 702/33, 702/145, 148; 303/132, 138
See application file for complete search history.

(56) References Cited

U.S. PATENT DOCUMENTS

| | | | |
|---|---|---|---|
| 4,890,231 A | 12/1989 | Frantz | |
| 5,586,028 A * | 12/1996 | Sekine et al. ............... | 701/1 |
| 5,719,365 A * | 2/1998 | Tanimizu et al. ........... | 218/118 |
| 5,719,565 A * | 2/1998 | Tsuno et al. ................ | 340/905 |
| 5,839,535 A * | 11/1998 | Arai ........................... | 180/197 |
| 5,901,806 A | 5/1999 | Takahashi | |
| 6,166,657 A | 12/2000 | Mann | |
| 6,216,082 B1 | 4/2001 | Minowa et al. | |
| 6,281,806 B1 | 8/2001 | Smith et al. | |
| 6,285,944 B1 | 9/2001 | Tange et al. | |
| 6,351,702 B1 | 2/2002 | Tange et al. | |
| 6,624,747 B1 * | 9/2003 | Friederich et al. ........ | 340/436 |
| 6,650,987 B1 * | 11/2003 | Kogure et al. ............. | 701/80 |
| 2001/0029421 A1 * | 10/2001 | Watanabe et al. .......... | 701/80 |

\* cited by examiner

*Primary Examiner*—Jack Keith
*Assistant Examiner*—Tuan C To

(57) ABSTRACT

A new automotive (speed control system) safety feature is disclosed. A vehicle with an engaged speed control could be dangerous to drive on a road surface that changes from dry, offering little rolling resistance, to a surface that offers increased resistance to tire rotation. Resistance to tire rotation by water or snow on a road surface will cause an engaged speed control system to try and maintain the set vehicle speed by accelerating the vehicle into the rolling resistance. A driver may lose control of the vehicle in this circumstance if the speed control cannot be disabled immediately. The new safety feature disclosed would automatically disable the vehicle speed control system when the vehicle decelerates due to significant water or snow accumulation on the road surface.

1 Claim, 1 Drawing Sheet

AUTOMOTIVE SPEED CONTROL DISABLE SWITCH

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

This invention relates to an automotive electronic speed control for vehicles (cruise control), and more specifically to a new safety disable or cut out switch for an automotive speed control system.

Present day automotive electronic speed control or cruise control systems can be manually switched on or off, or temporarily disabled and enabled by electromechanical switches located proximate the vehicle driver. As a necessary safety requirement, the vehicle cruise control is automatically disabled by depression of the vehicle brake pedal.

Also, vehicles equipped with traction control systems that limit wheel spin when the traction control system detects that one or more drive wheels are spinning, or detects loss of traction, will automatically disable the vehicle cruise control system when loss of traction is detected.

Various electronic speed control systems for motor vehicles utilize one or more detectable conditions to either prevent engagement of, or automatically disengage the speed control system. Some of the conditions monitored by a cruise control system and used as a basis for engagement or disengagement of the cruise control system are brake on, vehicle speed too low, park/neutral engaged (automatic transmission), clutch engaged (manual transmission), engine RPM too high, and the ratio of engine speed to vehicle speed out of an acceptable range.

In U.S. Pat. No. 4,890,231 issued Dec. 26, 1989 to Frantz; disclosure is made of a means to disable a speed control resume switch if it is found in an engage condition at the same time that normal speed control cut outs are in effect.

Takahashi, in U.S. Pat. No. 5,901,806 issued on May 11, 1999 discloses a vehicle speed control system that includes a sensing camera for measuring the distance and speed of a forward vehicle in front of a controlled vehicle, and means to automatically adjust the speed of the controlled vehicle to maintain a set following distance of the controlled vehicle behind the forward vehicle.

In U.S. Pat. No. 6,166,657 issued to Mann on Dec. 26, 2000 an imminent icing condition detector employing an infrared sensor that monitors a road surface condition from a motor vehicle is disclosed. When the sensor signals the likelihood of road icing conditions a control circuit initiates the dispensing of a de-icing, anti-icing or traction substance.

U.S. Pat. No. 6,216,082 issued Apr. 10, 2001 to Minowa, et al., discloses a means to control the speed and acceleration/deceleration of a controlled vehicle and to automatically change the speed or acceleration/deceleration of the controlled vehicle relative to a detected forward vehicle, and to include other road conditions such as road gradient in the speed or acceleration/deceleration calculations.

In U.S. Pat. No. 6,281,806 issued Aug. 28, 2001 to Smith, et al., a driver road hazard and warning system is disclosed that senses objects ahead of a vehicle, and intelligently determines if the presence of the object on or near the current path of the vehicle justifies alerting the vehicle driver. If the system determines a driver alert is required, the system directs light onto the object and is capable of maintaining light on the object even as both the vehicle and object move relative to each other.

In U.S. Pat. No. 6,285,944 issued Sep. 4, 2001, to Tange, et al., disclosure is made of an automatic automotive velocity control for a motor vehicle that will automatically disengage if the apparatus determines that the road surface has a low coefficient of friction. Also, if the driver requests to engage the automatic velocity control system and the system detects a low road surface coefficient of friction, a warning is issued to the driver and the driver must reinitiate the request to engage the velocity control system.

In U.S. Pat. No. 6,351,702 issued Feb. 26, 2002 to Tange, et al., disclosure is made of an apparatus for automatically controlling vehicular velocity so as to maintain an inter-vehicle distance to a preceding vehicle, and an apparatus feature that releases the follow up run control system in a manner that allows the vehicle to transition from an automatically controlled speed to a manually controlled speed with no noticeable speed irregularities even on a road surface with a low frictional coefficient.

None of the above inventions and patents, taken either singly or in combination, is seen to describe this instant invention as claimed.

SUMMARY OF THE INVENTION

The present invention is a new additional safety related automotive speed control disconnect switch. An additional automatic speed control system cut out switch is needed because a motor vehicle traveling at high speed that encounters tire rotation resistance caused by an encounter with water build up on the roadway surface, or unseen snow, may go out of control as the vehicle speed control system accelerates the vehicle trying to overcome the unexpected rolling resistance and maintain the vehicle set speed.

The new automotive safety speed control disconnect switch is comprised of a detection device that will detect and signal the presence or absence of significant water on a road surface, a detection device that will detect and signal the presence or absence of snow on a road surface, a device that will detect and signal vehicle deceleration or the lack thereof, an override switch, an electronic processor that will monitor the signals received from the water detector, the snow detector, the deceleration detector, and the override switch, and an output device that can disconnect or disable the vehicle speed control, or connect or enable said speed control. The processor would be programmed to operate the output device to disconnect or disable the vehicle speed control system if the presence of road surface water or snow were detected coincident with a vehicle deceleration signal, and in the absence of an override signal. A visual light signal would inform the vehicle driver of the disable of the vehicle speed control system initiated by the speed control disable switch. If the vehicle driver determined that the vehicle speed control system could be safely used at a slower set speed, the override switch of the speed control disable switch could be operated and the vehicle speed control system reengaged.

DETAILED DESCRIPTION OF THE PREFERRED EMBODIMENT OF THE INVENTION

Figure 1:
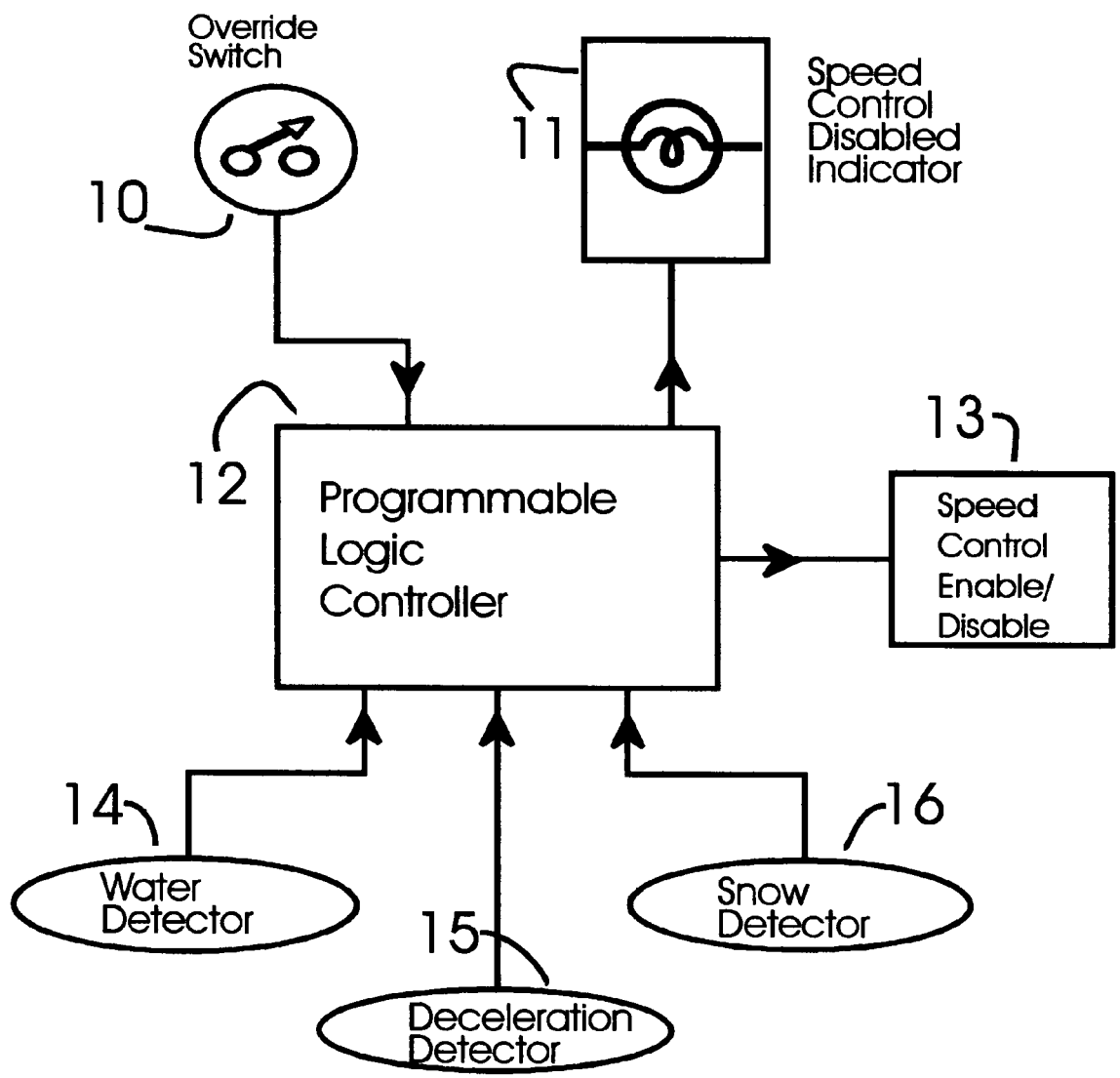
FIG. 1 is a block diagram of an Automotive Speed Control Disable Switch

FIG. 1 is a block diagram of a safety disable or cut out switch for an automotive speed control system that disables said speed control system when significant water or snow is detected on a road surface coincident with vehicle deceleration. The override switch 10 in FIG. 1 is input into the programmable logic controller 12 and is used by a motor vehicle operator to engage the vehicle speed control system when the programmable logic controller has inputs that disallow the operator the use of the vehicle speed control system. If water detector 14 or snow detector 16, or both water detector 14 and snow detector 16, signal the programmable logic controller 12 that water and or snow are present on the roadway surface there will be no disable output signal to speed control enable/disable switch 13. However, if either water detector 14 or snow detector 16 or both detectors 14 and 16 signal the programmable logic controller that water or snow or both water and snow are present on the roadway surface, and deceleration detector 15 signals the programmable logic controller that the vehicle is decelerating, a disable control signal will be output from the programmable logic controller to speed control enable/disable switch 13.

What is claimed is:

1. An automatic means to disconnect or disable a motor vehicle speed control system when a motor vehicle is decelerating, and a coincident road surface change from dry or damp to wet or snow covered is detected; comprising:

a means to detect and to signal the presence or absence of water on a roadway surface;

a means to detect and to signal the presence or absence of accumulated snow on a roadway surface;

a means to detect and to signal the presence or absence of vehicular deceleration:

a means to logically determine that programmed requirements for outputting a disable signal has been met, and to generate and output a disable signal;

a means to logically determine that programmed requirements for generating a disable signal have not been met, and to inhibit the output of the disable signal;

a means to override a programmed logic controller and to disable the output signal of the programmed logic controller;

a means to disable or disconnect the vehicle speed control system when the presence of roadway surface water or snow is detected, and the vehicle is decelerating;

and a means to enable or re-enable the vehicle speed control system in the absence of a disable or disconnect signal from the programmed logic controller.

* * * * *